United States Patent [19]

Mitsumoto

[11] Patent Number: 5,014,670
[45] Date of Patent: May 14, 1991

[54] SPARK IGNITION TIMING CONTROL SYSTEM FOR INTERNAL COMBUSTION ENGINE

[75] Inventor: Hisashi Mitsumoto, Kanagawa, Japan

[73] Assignee: Nissan Motor Company, Limited, Yokohama, Japan

[21] Appl. No.: 524,313

[22] Filed: May 16, 1990

[30] Foreign Application Priority Data

May 16, 1989 [JP] Japan .................... 1-123769

[51] Int. Cl.$^5$ ............. F02P 5/14; F02M 51/00; F02B 13/00
[52] U.S. Cl. ................... 123/425; 123/575; 123/602; 123/494; 123/479
[58] Field of Search .......... 123/425, 575, 479, 602, 123/494, 1 A, 486, 1 R, 435

[56] References Cited

U.S. PATENT DOCUMENTS

| | | | |
|---|---|---|---|
| 4,546,732 | 10/1985 | Mae et al. | 123/1 A |
| 4,694,811 | 9/1987 | Benncet | 123/575 |
| 4,884,530 | 12/1989 | Bockhaus et al. | 123/1 A |
| 4,905,655 | 3/1990 | Maekawa | 123/494 |
| 4,909,225 | 3/1990 | Gonze et al. | 123/494 |
| 4,945,881 | 8/1990 | Gonze et al. | 123/486 |
| 4,951,630 | 8/1990 | Iwata | 123/435 |

*Primary Examiner*—Raymond A. Nelli
*Attorney, Agent, or Firm*—Foley & Lardner

[57] ABSTRACT

In order to accomplish aforementioned and other objects, a spark ignition timing control system, according to the present invention employs means for monitoring maximum pressure point in an engine revolution cycle, where the internal pressure in an engine cylinder becomes maximum for deriving period required for fully propagating combustion in the engine cylinder on the basis of angular difference between spark ignition initiating point and the maximum, pressure point. The means predicts concentration of one of fuels in a mixture fuel on the basis of the derived propagating period. The system compares the predicted concentration with an actually measured concentration of the relevant fuel by means of a sensor to detect failure of the sensor. When failure of the sensor is detected, fail-safe operation is performed by setting the concentration data at a predetermined fixed value.

5 Claims, 7 Drawing Sheets

SPARK IGNITION TIMING CONTROL SYSTEM FOR INTERNAL COMBUSTION ENGINE ADAPTED TO MIXTURE FUEL OF MORE THAN ONE INDIVIDUAL FUELS WITH FAIL-SAFE FEATURE IN CASE OF FAILURE OF OPERATION OF SENSOR MONITORING CONCENTRATION OF ONE OF INDIVIDUAL FUEL IN MIXTURE FU

BACKGROUND OF THE INVENTION

The present invention relates generally to a spark ignition timing control system for an automotive internal combustion engine for adjusting spark advance magnitude for optimal engine performance. More specifically, the invention relates to a spark ignition timing control system specifically adapted for controlling spark ignition timing in engine operation combustioning a mixture fuel, in which more than one type fuels, such as gasoline and alcohol, having mutually different combustion characteristics.

It is recent trend in the automotive technology to seek for higher anti-polution performance for protecting or recover pure atmosphere. Particularly, in the automotive vehicle exhaust gas, significant reduction of polutant, such as $NO_x$, CO and so forth, is becoming more and more strong order for this purpose. As can be appreciated, from the past, various attempts have been made for purification of engine exhaust gas. Such attempts gain significant level of improvement in terms of anti-polution. However, in view of increasing of automotive vehicles, further purification of exhaust gas becomes strictly important.

From the past, it has been known in the automotive technologies that alcohol fuel may create much lesser polutant, such as $NO_x$, CO and so forth, in comparison with petrol or gasoline. Since alcohol fuel can be industrially or artificially produced, hi-bride fuel engines have already been developed and put into the market in certain countries. Such hi-bride fuel engine utilizes a blended fuel of gasoline and alcohol. In such blended fuel, combustion characteristics of the fuel varies significantly depending upon gasoline/alcohol mixture ratio due to relatively low combustibility of alcohol. Therefore, in case of such blended fuel, fuel delivery amount in terms of an induction air flow rate, spark ignition timing and so forth need to be controlled adapting the blended fuel property.

As is well known, spark ignition timing controls are performed principally for seeking spark advance angle for best torque in view of optimization f engine output performance. Such MBT control is combined with knock control in which spark advance angle is adjusted for maintaining the engine in light-knock condition. For harmonizing both of the MBT and the knock control, Japanese Patent First (unexamined) Publication (Tokkai) Showa 61-14479 proposes spark ignition timing control for controlling spark advance angle with respect to respective of individual engine cylinders. Namely, in the proposed system, knocking resistance at each individual engine cylinder is experimentally checked. MBT control is then performed in view of a cylinder pressure data in an engine cylinder having the highest knocking resistance until unacceptable engine knocking is detected. When unacceptable engine knocking is detected at the aforementioned specific engine cylinder having the highest knocking resistance, then the engine cylinder having second highest knocking resistant is selected to use the cylinder pressure data thereof for MBT control. Such proposal may be effective for enabling advancing of spark advance in most of the engine cylinders at MBT point.

The aforementioned prior proposal may be only applicable for the spark ignition timing control in terms of homogeneous fuel, i.e. gasoline, engine. In case of blended fuel, the proposed procedure of spark advance control cannot be directly applied due to substantial variation of MBT points depending upon gasoline/alcohol blending ratio. Substantial variation of MBT points may not significantly affect for the spark ignition timing control performance as far as steady or stable engine operating condition is concerned since the spark advance angle can be gradually adjusted toward the MBT point by feedback control. However, on the other hand, in the engine transition state, such as accelerating and decelerating state of the engine, offset of spark advance angle from MBT will cause substantial degradation of spark ignition timing control performance. Namely, when the spark advance angle is set at far retard angle from MBT point, the engine output can be lowered than that can be obtained at MBT point, to cause lowering of engine acceleration performance during engine acceleration state. On the other hand, excess magnitude of spark advance in terms of MBT point will leads unacceptable engine knocking.

In view of such difficulty, Japanese Patent First Publication (Tokkai) Showa 61-85578 proposed setting of variable basic spark advance in terms of property of fuel to be combustioned. For this, a fuel sensor for detecting mixture ratio or concentration of one of individual fuels in the blended fuel to select one of a plurality of settings. In case of gasoline/alcohol blended fuel, since the fuel property changed substantially according to the concentration of alcohol versus gasoline, substantially large capacity of memory becomes necessary for pre-setting various basic spark advance with respect to all possible variation range of alcohol mixture ratio.

On the other hand, Japanese Utility Model First (unexamined) Publication (Jikkai) Showa 62-171198 discloses a spark ignition timing control system which is adapted for alcohol/gasoline mixture fuel. The shown system performs MBT control and knock control for optimizing the engine performance. As well, the shown system employs an alcohol sensor for monitoring alcohol concentration in the mixture fuel so that the spark ignition timing can be modified according to the concentration of the alcohol in the mixture fuel. Modification of the spark ignition timing depending upon alcohol concentration as monitored by the alcohol sensor.

In such a prior proposed spark ignition timing control system it is essential that the alcohol sensor for monitoring alcohol concentration operates accurately for significant influence of the alcohol concentration for the spark ignition timing. However, since the alcohol sensor is dipped into the fuel, it can subject corrosion or fatigue to cause failure during long time use. As set forth, failure of alcohol sensor may cause substantial problem in control of the spark ignition timing.

SUMMARY OF THE INVENTION

Therefore, it is an object of the present invention to provide a spark ignition timing control system which can detect failure of a sensor which monitors concentration of one of fuel in a mixture fuel for performing fail-safe operation.

In order to accomplish aforementioned and other objects, a spark ignition timing control system, according to the present invention employs means for monitoring maximum pressure point in an engine revolution cycle, where the internal pressure in an engine cylinder becomes maximum for deriving period required for fully propagating combustion in the engine cylinder on the basis of angular difference between spark ignition initiating point and the maximum, pressure point. The mans predicts concentration of one of fuels in a mixture fuel on the basis of the derived propagating period. The system compares the predicted concentration with an actually measured concentration of the relevant fuel by means of a sensor to detect failure of the sensor. When failure of the sensor is detected, fail-safe operation is performed by setting the concentration data at a predetermined fixed value.

According to one aspect of the invention, a spark ignition timing control system for an internal combustion engine adapted for combustioning with a blended fuel composed of more than one mutually different fuels, comprises:

first sensor means for monitoring a preselected basic engine operating parameters to produce a first sensor signal representative of the monitored engine operation condition;

second sensor means for monitoring concentration of a specific one of fuels in the blended fuel to produce a specific fuel concentration indicative second sensor signal;

third sensor means for monitoring variation of internal pressure in an engine cylinder to produce a third sensor signal indicative of the monitored internal pressure;

fourth means for deriving a basic fuel advance angle on the basis of the first sensor signal;

fifth means for deriving a first correction value on the basis of the third sensor signal;

sixth means for deriving a second correction value on the basis of the concentration of the specific fuel, the specific fuel concentration normally corresponding to the second sensor signal value;

seventh means for correcting the basic fuel advance angle with the first and second correction value for deriving a spark advance angle to control the spark ignition timing; and eighth means for detecting the lag period between spark ignition and occurrence of the maximum pressure in the engine cylinder to predict concentration of the specific fuel, and comprising the predicted specific fuel concentration with the specific fuel concentration represented by the second sensor signal for detecting failure of the second sensor means on the basis of the difference therebetween, the eighth means replacing the specific fuel concentration represented by the second sensor signal with a given value for derivation of the second correction value.

Preferably, the eighth means compares the spark advance angle at which spark ignition is actually performed and an angle at which maximum pressure in the engine cylinder is detected for deriving an angular deviation therebetween and arithmetically derives the lag time for predicting the concentration of the selected one of fuels. Furthermore, the eighth means compares the predicted specific fuel concentration with the specific fuel concentration represented by the second sensor signal for deriving the difference, compares the derived difference with a predetermined difference criterion for detecting the derived difference greater than or equal to the difference criterion, counts-up occurrence of the derived difference greater than or equal to the difference criterion, and compares the counted value with a counter threshold to make judgement that the second sensor means is in failure when the counter value is greater than or equal to the counter threshold.

It is also possible to provide ninth means for monitoring an actual air/fuel ratio of an actually combustioned air/fuel mixture, deriving a target air/fuel ratio on the basis of the specific fuel concentration represented by the second sensor signal and comparing the actual air/fuel ratio and the target air/fuel ratio to count-up occurrence of deviation between the actual air/fuel ratio and the target air/fuel ratio for making judgement that the second sensor is in failure when the counted value becomes greater than or equal to a counter criterion.

The first sensor may monitor the basic engine operating parameter including an engine revolution speed and an engine load, and the sixth means derives a first correction value component on the basis of the concentration of the specific fuel and the engine revolution speed and a second correction value component on the basis of the concentration of the selected one of the fuels and the engine load.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment but are for explanation and understanding only.

In the drawings.

DESCRIPTION OF THE PREFERRED EMBODIMENT

Figure 1:
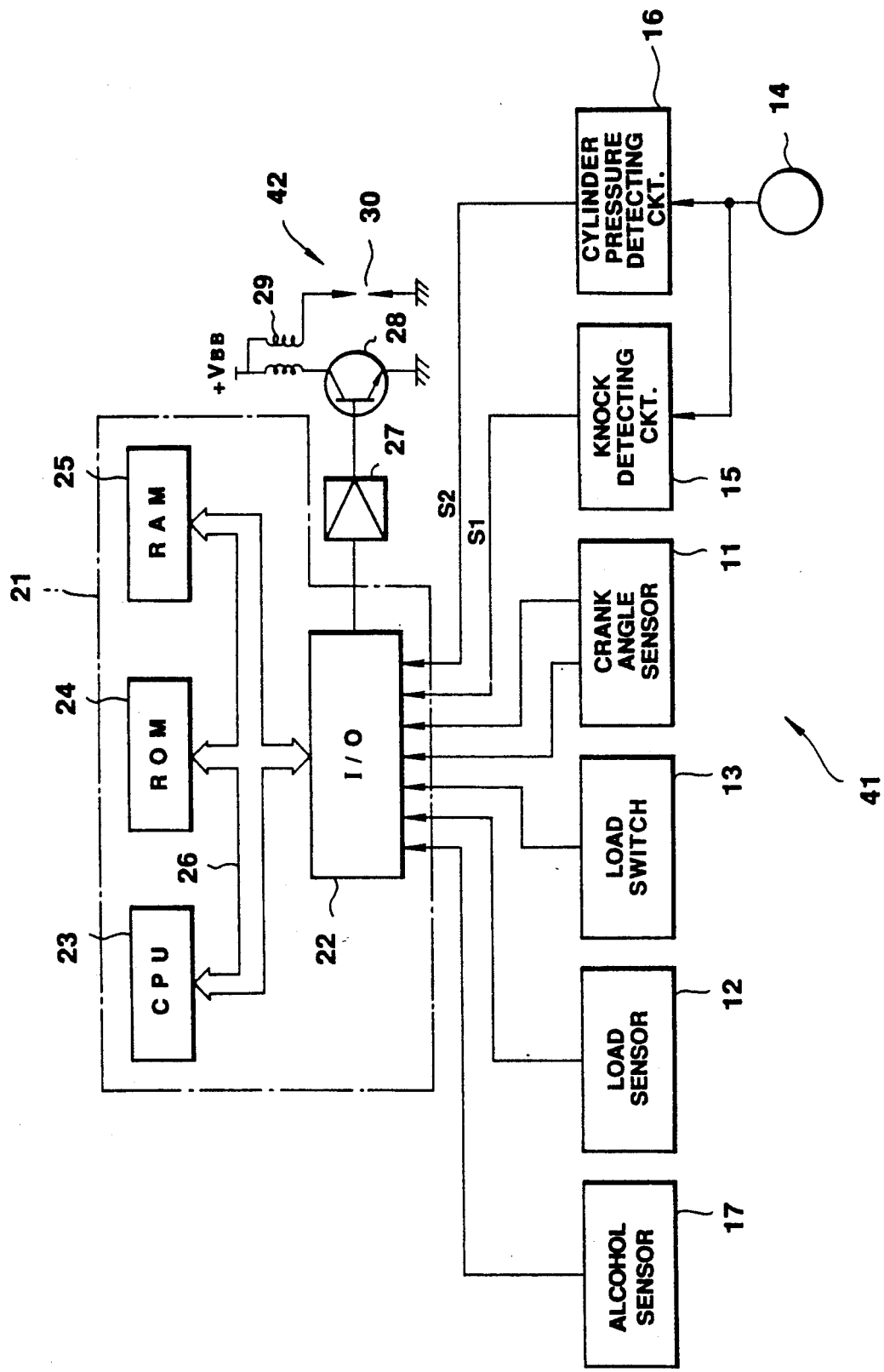
FIG. 1 is a block diagram of the preferred embodiment of a spark ignition timing control system, according to the present invention.

Referring now to the drawings, particularly to FIG. 1, the preferred embodiment of a spark ignition timing control system, according to the present invention, has a control unit 21 comprises a microprocessor including an input/output unit 22, central processing unit (CPU) 23, a random access memory (RAM) 25 and read-only member (ROM) 24. A crank angle sensor 11, an engine load sensor 12, a load switch 13, a pressure sensor 14 and an alcohol sensor 17 are provided for monitoring control parameters and thus feed parameter data to the control unit 21. The crank angle sensor 11 monitors an angular position of a crankshaft for producing a crank reference signal $\theta_{REF}$ at every predetermined angular position of the crankshaft and a crank position signal $\theta_{POS}$ at every predetermined angle of angular displacement of the crankshaft. The engine load sensor 12 typically comprises an intake air flow sensor, such as an air flow meter, for monitoring an intake air flow rate as a data reflecting an engine load condition Qa to provide an engine load indicative data for the control unit 12. The engine load sensor should not be appreciated to be specified to the intake air flow sensor but can be replaced with various sensors monitoring equivalent parameters reflecting the engine load condition, such as a throttle angle sensor, an intake vacuum sensor and so forth. The engine load switch 13 may typically comprises an engine idling switch 13 detecting an idling condition of the engine to produce a binary signal varying signal level between HIGH level and LOW level depending upon the engine load condition. For example, in case of the engine idling switch, it tuns ON to provide HIGH level engine idling state indicative signal when engine idling condition, e.g. a throttle valve is fully closed or substantially closed position. The pressure sensor 14 to be employed in the shown embodiment is adapted to monitor a pressure in the interior of the engine combustion chamber to produce a pressure indicative signal. Typically, the pressure sensor 14 comprises a washer type sensor fixed onto an engine cylinder block or cylinder head together with an ignition plug. The pressure sensor 14 is connected to a knock detector circuit 15 and a cylinder pressure detecting circuit 16. The knock detector circuit 15 processes the pressure indicative signal of the pressure sensor 14 to produce an engine knocking data $S_1$ representative of a magnitude of engine knocking occurring in the engine cylinder. On the other hand, the cylinder pressure detecting circuit 16 processes the pressure indicative signal to produce a cylinder pressure data $S_2$ representative of the internal pressure in the engine cylinder. The alcohol sensor 17 is designed to be disposed within a fuel feeding path or fuel tank for monitoring concentration in the blended fuel. The alcohol sensor 17 thus generate an alcohol concentration indicative signal $R_{SE}$ indicative of the monitored concentration of alcohol in the blended fuel.

The input/output unit 22 is connected to a power transistor 28 via an output amplifier 27 to provide a trigger signal. The power transistor 28 is thus switched between ON and OFF for controlling supply of electric power to an ignition coil 29 from a power source, i.e. vehicular battery $V_{BB}$ to cause spark ignition in a spark plug 30 at a controlled timing.

As is well known, the spark ignition timing control system performs MBT control for adjusting spark advance angle at an angle where the highest internal pressure in the engine cylinder is obtained and knock control for maintaining the engine knocking magnitude at light knock condition. For this, a basic spark advance angle BASE is derived on the basis of an engine revolution speed N and an engine load reflective data Tp ($=K \times Qa/N$ K: constant). A cylinder pressure dependent correction value is derived on the basis of the cylinder pressure data so as to adjust the spark advance at the angle where the maximum internal pressure $\theta_{pmax}$ is obtained in feedback manner. The correction value derived on the basis of the angular position to obtain the maximum internal pressure $\theta_{max}$ will be hereafter referred to as "MBT correction value $\Delta\theta_1$". For detecting the maximum internal pressure $\theta_{pmax}$ in the engine cylinder, the cylinder pressure data is sampled at every 1 degree of angular displacement of the crankshaft in a range of the top-dead-center (TDC) and 50 degree advanced from TDC (ATDC 50°) and thus detects the crankshaft angular position at which the maximum internal pressure is obtained. This process for detecting the maximum pressure point of the crankshaft angular position has been disclosed in Japanese Patent First (unexamined) Publication (Tokkai) Showa 59-39974, for example. The disclosure of this Tokkai Showa 59-39974 is herein incorporated by reference for the sake of disclosure. A spark advance angle ADV derived by correcting the basic spark advance angle BASE by the MBT correction value $\Delta\theta_1$, a knock control correction value $\Delta\theta_2$ and an alcohol concentration dependent correction value $\Delta\theta_3$. In genera, the MBT correction value $\Delta\theta_1$ is derived for adjusting the spark advance angle toward the MBT point.

The spark advance angle ADV thus derived in the most recent derivation cycle is set as "current advance angle data STADV". Then, the current advance angle data STADV is compared with the maximum pressure point angle $\theta_{pmax}$ to derive a advance angle deviation data DADV($=\theta_{pmax}-$STADV). As long as engine combustioning condition is unchanged, the advance angular deviation data DADV represents combustion propagation period within the engine cylinder. Therefore, the period TADV can be derived by:

$$TASDV = (DADV/N) \times C$$

where C is constant.

Figure 5:
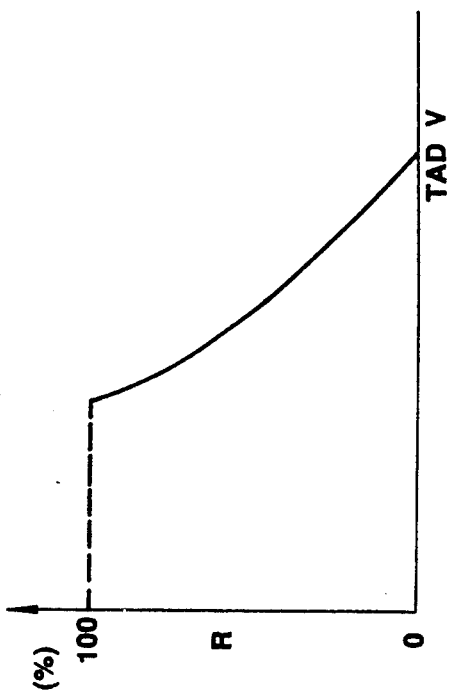
FIG. 5 is a chart showing relationship between alcohol concentration and combustion propagation period.

The period TADV derived as set forth above will be referred to as "combustion propagation period". Relationship between the concentration $R_{PR}$ of alcohol in the blended fuel versus the combustion propagation period is illustrated in FIG. 5. In other words, the alcohol concentration $R_{PR}$ in the blended fuel can be predicted on the basis of the combustion propagation period data TADV.

Figure 4:
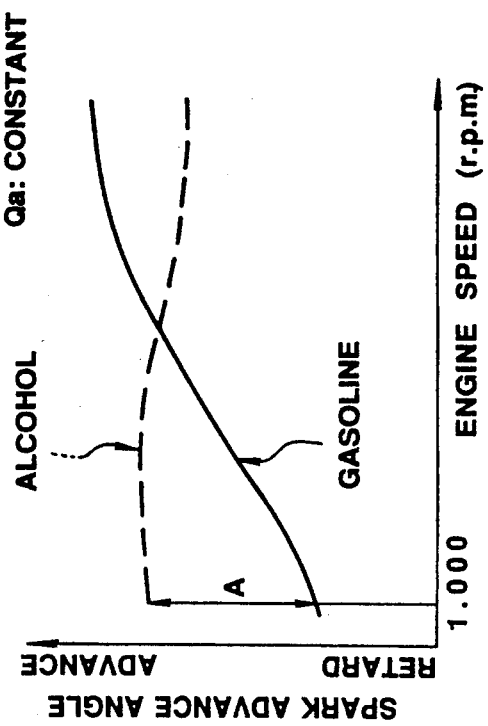
FIG. 4 is a chart showing variation of spark advance angle in relation to an engine revolution speed.
Figure 3:
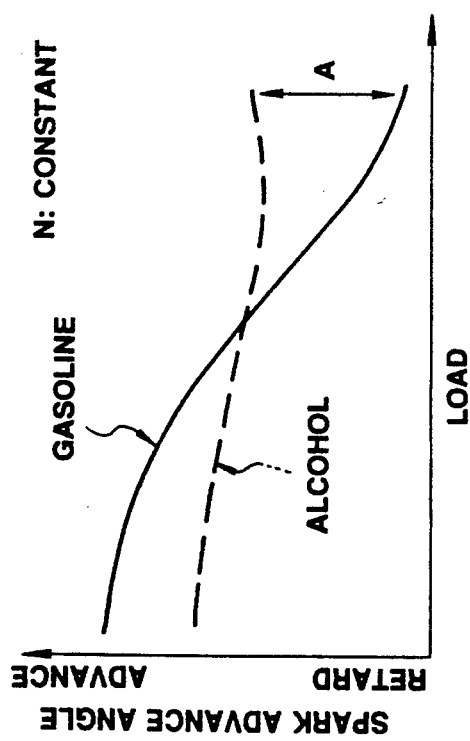
FIG. 3 is a chart showing variation of spark advance angle in relation to an engine load.
Figure 6:
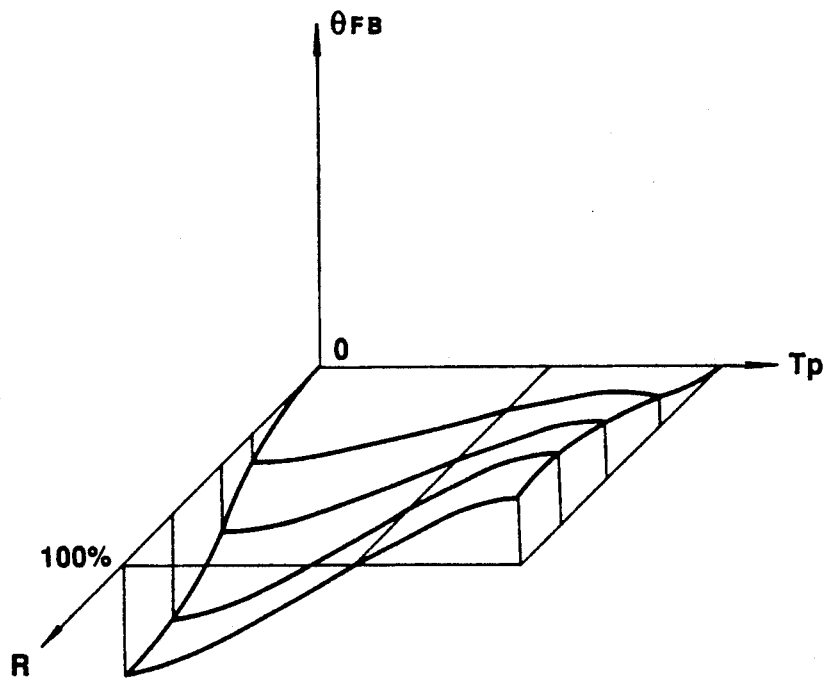
FIG. 6 is an illustration of three-dimensional table set in terms of feedback correction value, the combustion propagation period and Tp value.
Figure 7:
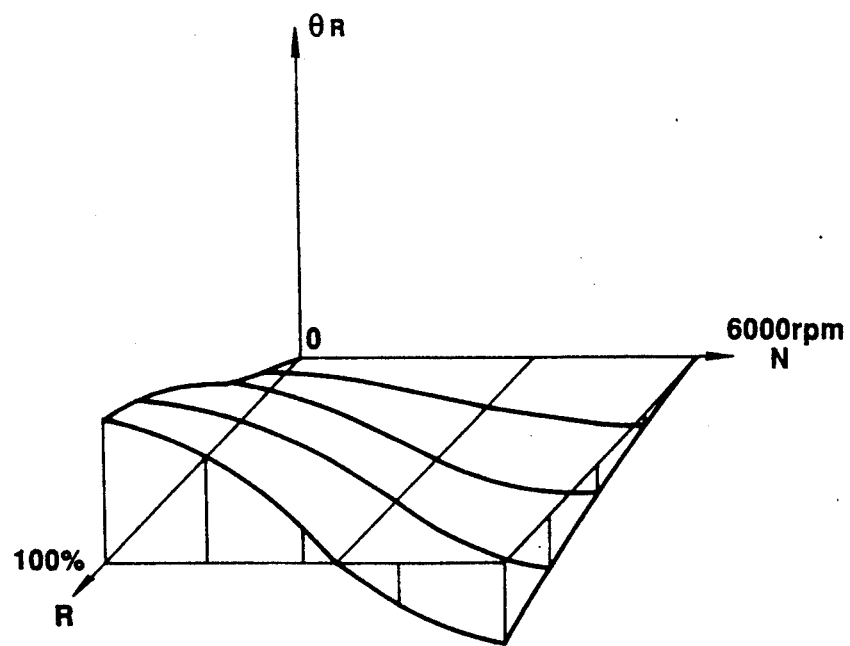
FIG. 7 is an illustration of three-dimensional table set in terms of alcohol concentration dependent correction value and an engine speed.
Figure 8:
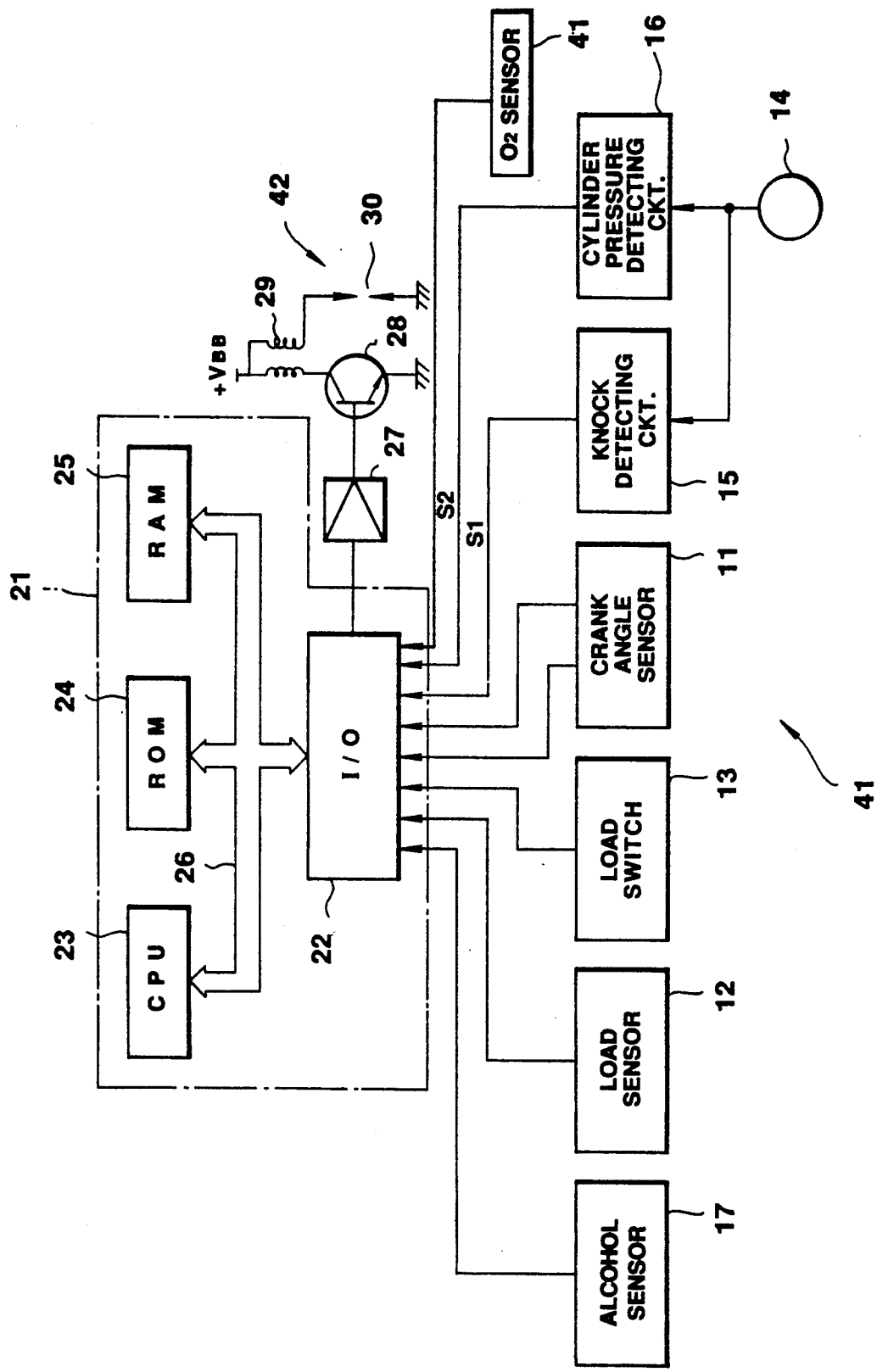
FIG. 8 is a block diagram of another embodiment of the spark ignition timing control system according to the invention, which embodiment is particularly adapted for lean mixture combustion.

The alcohol concentration $R_{PR}$ thus predicted identifies the position of the lateral axis on the charts of FIGS. 3 and 4. Therefore, utilizing the chart of FIGS. 3 and 4 which may be set in a form of tables, an engine speed dependent correction value $\Delta\theta_{RN}$ and an engine load dependent correction value $\Delta\theta_{RTp}$ are derived respectively in terms of the engine revolution speed data N and the engine load reflective data Tp. The engine speed dependent data $\Delta\theta_{RN}$ thus derived has variation characteristics as illustrated in FIG. 6. Similarly, the engine load dependent correction value $\Delta\theta_{RTp}$ has variation characteristics as shown in FIG. 7. In FIGS. 6 and 7, the polarity of the correction values $\Delta\theta_{RN}$ and $\Delta\theta_{RTp}$ represents direction of adjustment. Namely, when the correction value is in positive value range requires advancing adjustment of the spark advance angle and the negative correction value range requires retarding adjustment of the spark advance angle. The engine speed dependent correction value $\Delta\theta_{RN}$ and the engine load dependent correction value $\Delta\theta_{RTp}$ are summed to derive a alcohol concentration dependent correction value $\Delta\theta_R$.

On the other hand, knock control to be performed by the preferred embodiment of the spark ignition timing control system, is performed in per se known manner. Namely, a knock control correction value $\Delta\theta_2$ is derived for suppressing heavy knocking and maintain the knocking magnitude at light knock condition. The knock control correction value $\Delta\theta_2$ is summed with the MBT correction value $\Delta\theta_1$ to form a feedback correction value $\Delta\theta_{FB}$.

With this process, since high precision of control can be provided by the feedback correction values $\Delta\theta_{FB}$ for adapting the spark advance angle to the actual engine driving condition, the alcohol concentration dependent correction value $\Delta\theta_R$ is not required high precision. As a result, the table for using in derivation of the alcohol concentration dependent correction value $\theta_R$ can be rough enough to enable establishment of the table without requiring substantially large capacity for the memory.

Figure 2:
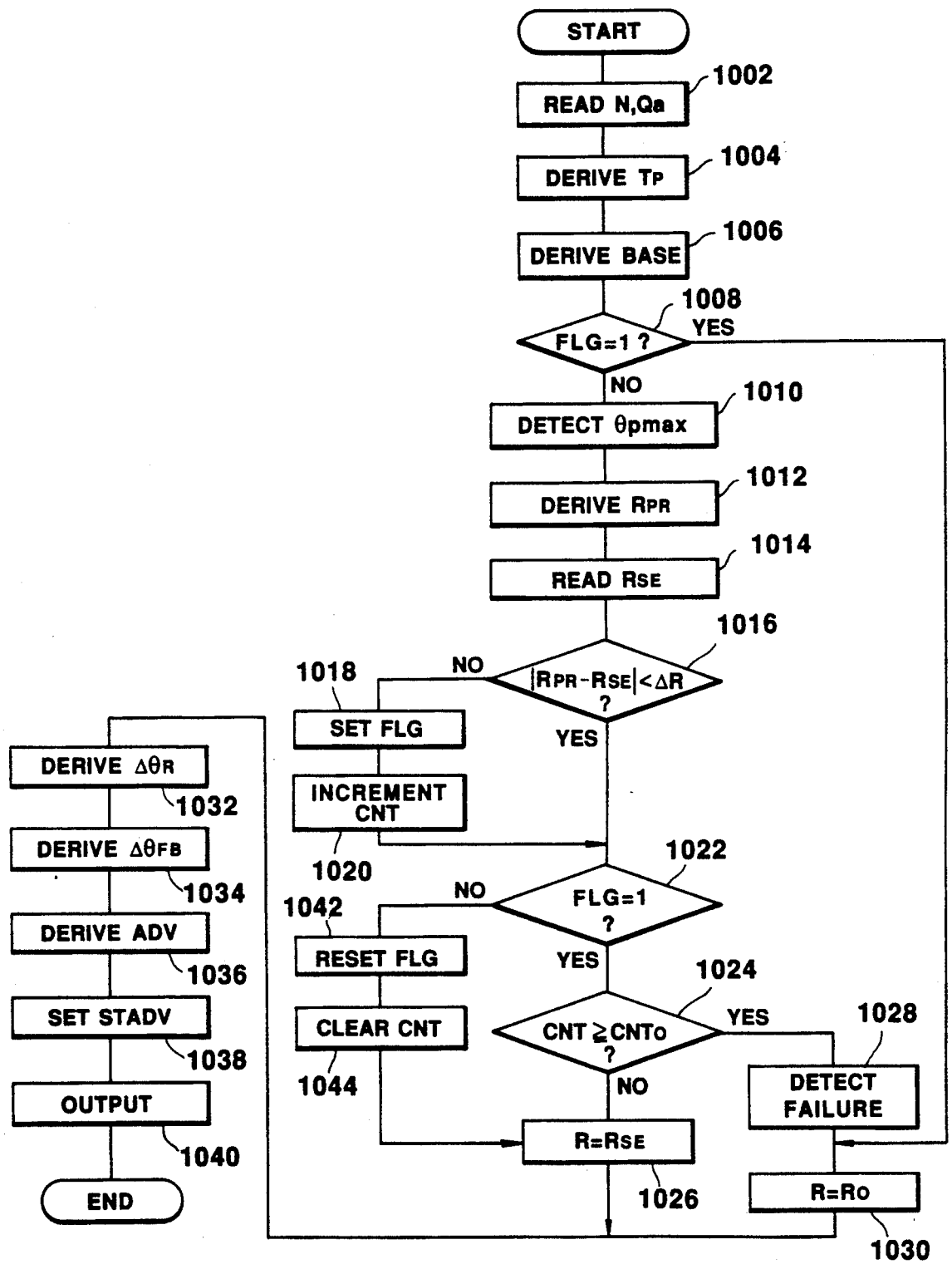
FIG. 2 is a flowchart showing a process of spark ignition timing control performed by the preferred embodiment of the spark ignition timing control system of FIG. 1.

The process of spark ignition timing to be executed by the preferred embodiments of the spark ignition timing control system, according to the present invention will be discussed herebelow with reference to FIG. 2. The flowchart illustrated in FIG. 2 shows a routine for controlling spark ignition timing to be executed at every predetermined timing. Immediately after staring execution, the engine speed data N representative of the engine revolution speed is read at a step 1002; and the engine load reflective data Tp is read at a step 1004. Then, on the basis of the engine speed data N and the engine load reflective data Tp, the basis spark advance angle BASE is derived at a step 1006. Then, at a flag FLG indicative of failure of the alcohol sensor, is checked whether it is set or not, at a step 1008. When the flag FLG is not set as checked at the step 1008, the maximum pressure point $\theta_{pmax}$ is read out at a step 1010. Then, on the basis of the maximum pressure point data $\theta_{pmax}$ and the current advance angle data STADV, prediction of the predicted alcohol concentration $R_{PR}$ is performed in a manner set forth above, at a step 1012. Then, the alcohol concentration indicative signal $R_{SE}$ is read out at a step 1014. Then, at a step 1016, a difference ($=R_{PR}-R_{SE}$) is calculated and the absolute value thereof is compared with a predetermined threshold value $\Delta R$. When the absolute value $|R_{PR}-R_{SE}|$ is greater than or equal to the threshold value $\Delta R$, the flag FLG is set at a step 1018. Subsequently, a counter value CNT is incremented by one (1) at a step 1020.

After the process at the step 1020 or when the absolute value $|R_{PR}-R_{SE}|$ is smaller than the threshold value $\Delta R$, the flag FLG is checked at a step 1022. If the flag FLG is set, the counter value CNT is compared with a predetermined abnormality detection criterion $CNT_0$ at a step 1024. When the counter value CNT as checked at the step 1024 is smaller than the abnormality detection criterion $CNT_0$, the predicted alcohol concentration $R_{PR}$ is updated by the alcohol concentration indicative signal value $R_{SE}$ of the alcohol sensor, at a step 1026. On the other hand, when the counter value CNT as checked at the step 1024 is greater than or equal to the abnormality detection criterion $CNT_0$, then, judgement is made that the alcohol sensor fails, at a step 1028. Then, fail-safe operation is initiated, in which the alcohol concentration R is set at a predetermined value $R_0$ at a step 1030. In the practical embodiment, the predetermined value $R_0$ is set at an alcohol concentration, corresponding spark advance angle may permit continuation of running of the engine. The predetermined value $R_0$ may be determined experimentarily. For example, the predetermined value may be set in a range of 35 to 50%.

At a step 1032, the alcohol concentration dependent correction value $\Delta\theta_R$ is derived on the basis of the engine speed data N, the engine load reflective data Tp and the alcohol concentration data R. The, the feedback correction value $\Delta\theta_{FB}$ is derived on the basis of the maximum pressure point data $\theta_{pmax}$ at a step 1034. Then, the basic spark advance angle BASE is corrected with the alcohol concentration dependent correction value $\Delta\theta_R$ and the feedback correction value $\theta_{FB}$ to derive a spark advance angle ADV, at a step 1036. The spark advance angle ADV is then set as the current advance angle data STADV at a step 1038. The spark advance angle indicative signal indicative of the spark advance angle ADV is output at a step 1040 for controlling spark ignition timing to be actually taken place.

FIGS. 8 to 11 shows another embodiment of the spark ignition timing control system according to the present invention. The shown embodiment is particularly adapted to a lean-burn engine for combustion with leaner mixture. The shown embodiment additionally employs an oxygen sensor 41 for monitoring oxygen concentration in the exhaust gas.

Figure 9:
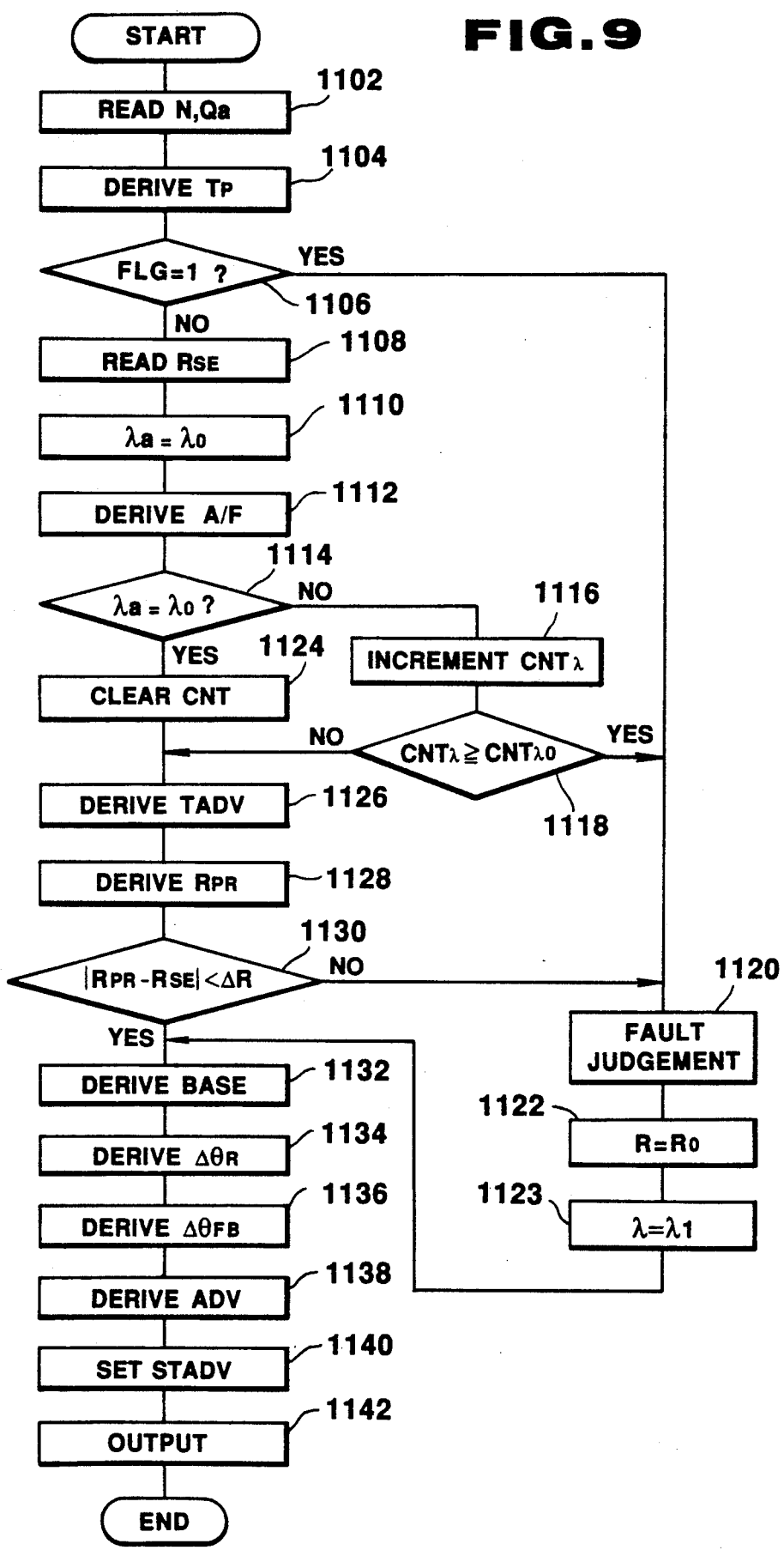
FIG. 9 is a flowchart showing process of the spark ignition timing control to be executed by the spark ignition timing control system of FIG. 8.
Figure 10:
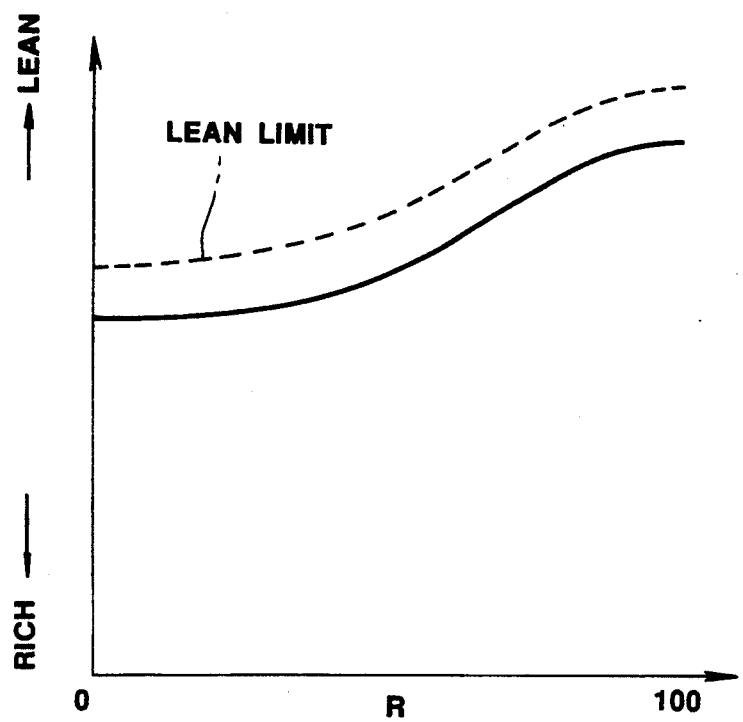
FIG. 10 is a chart showing variation of the set excess air ratio λ in relation to alcohol concentration R.

In the shown embodiment, the preferred process of spark ignition timing is modified from that in the former embodiment. The process is shown in FIG. 9. Similarly to the former embodiment, the engine speed N representative of the engine revolution speed is read at the step 1102; and the engine load reflective data Tp is read at a step 1104. Then, a flag FLG indicative of failure of the alcohol sensor, is checked whether it is set or not, at a step 1106. When the flag FLG is not set as checked at the step 1106, the alcohol concentration R is read out at a step 1108. Then, at a step 1110, a set of excess air ratio $\lambda$ is set at a predetermined lean-burn value $\lambda_0$. The excess air ratio $\lambda$ is variable depending upon the alcohol concentration as illustrated in FIG. 10. As can be seen, the excess air ratio $\lambda$ is set at a value slightly offsetting toward richer side from the lean limit. hen, an oxygen concentration indicative signal of the oxygen sensor 41 is read out at a step 1112. On the basis of the oxygen concentration indicative signal read at the step 1112, an actual air/fuel ratio $\lambda_a$ is derived and compared with a target air/fuel ratio represented by the lean-burn value $\lambda_0$ at a step 1114. If the actual air fuel ratio $\lambda_a$ as checked at the step 1114 is not equal to the target air/fuel ratio $\lambda_0$, a counter value $CNT_\lambda$ is incremented by one (1) at a step 1116. Then, the counter value $CNT_\lambda$ as incremented at the step 1116 is compared with a predetermined abnormality detection criterion $CNT_{\lambda 0}$, at a step 1118. When the counter value $CNT_\lambda$ is greater than or equal to the abnormality detection criterion $CNT_{\lambda 0}$, judgement is made that the alcohol sensor 17 is in failure, at a step 1120. Then, fail-safe operation is initiated to set the alcohol concentration R at the predetermined value $R_0$, at a step 1122. Subsequently, the set excess air ratio $\lambda$ is set at a predetermined value $\lambda_1$ which may correspond richer mixture. For example, the predetermined value $\lambda_1$ can be set at stoiciometric value.

Figure 11:
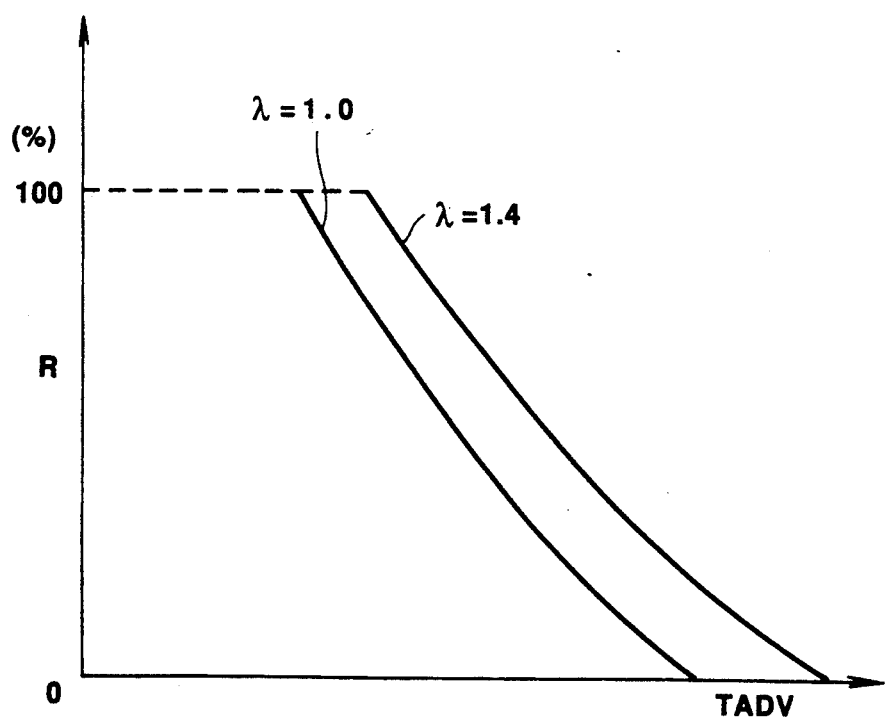
FIG. 11 is a chart showing variation of the predicted alcohol concentration $R_{PR}$ in relation to the set excess air ratio λ and the combustion propagation period.

On the other hand, if the actual air/fuel ratio $\lambda_a$ as checked at the step 114 is equal to the target air/fuel ratio $\lambda_0$, the counter value $CNT_\lambda$ is cleared at a step 1124. After the step 1124 or when the counter value $CNT_\lambda$ checked at the step 1118 is smaller than the abnormality detection threshold $CNT_{\lambda0}$, the combustion propagation period TADV is derived at a step 1126. As set forth, the combustion propagation period TADV is variable depending upon the set excess air ratio $\lambda$ and the alcohol concentration R, as illustrated in FIG. 11. Based on the combustion propagation period TADV derived at the step 1126, the predicted alcohol concentration $R_{PR}$ is derived at a step 1128. Then, the alcohol concentration indicative signal $R_{SE}$ is read out at a step 1130. Then, at the step 1130, a difference ($=R_{PR}-R_{SE}$) is calculated and the absolute value thereof is compared with a predetermined threshold value $\Delta R$. When the absolute value $|R_{PR}-R_{SE}|$ is greater than or equal to the threshold value $\Delta R$, the process goes to the step 1120.

When the absolute value $|R_{PR}-R_{SE}|$ is smaller than the threshold value $\Delta R$, or after the process at the step 1124, the basic spark advance angle BASE is derived on the basis of the engine speed data N and the Tp value at a step 1032. Then, at a step 1134, the alcohol concentration dependent correction value $\{\theta_R$ is derived on the basis of the engine speed data N, the engine load reflective data Tp and the alcohol concentration data R. Then, the feedback correction value $\Delta\theta_{FB}$ is derived on the basis of the maximum pressure point data $\theta_{pmax}$ at a step 1136. Then, the basic spark advance angle BASE is corrected with the alcohol concentration dependent correction value $\Delta\theta_R$ and the feedback correction value $\theta_{FB}$ to derive a spark advance angle ADV, at a step 1138. The spark advance angle ADV is then set as the current advance angle data STADV at a step 1140. The spark advance angle indicative signal indicative of the spark advance angle ADV is output at a step 1142 for controlling spark ignition timing to be actually taken place.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A spark ignition timing control system for an internal combustion engine adapted for combustioning with a blended fuel composed of more than one mutually different fuels, comprising:

first sensor means for monitoring a preselected basic engine operating parameters to produce a first sensor signal representative of the monitored engine operating condition;

second sensor means for monitoring concentration of a specific one of fuels in the blended fuel to produce a specific fuel concentration indicative second sensor signal;

third sensor means for monitoring variation of internal pressure in an engine cylinder to produce a third sensor signal indicative of the monitored internal pressure;

fourth means for deriving a basic fuel advance angle on the basis of said fist sensor signal;

fifth means for deriving a first correction value on the basis of said third sensor signal;

sixth means for deriving a second correction value on the basis of the concentration of the specific fuel, said specific fuel concentration normally corresponding to said second sensor signal value;

seventh means for correcting said basic fuel advance angle with said first and second correction values for deriving a spark advance angle to control the spark ignition timing; and eighth means for detecting lag period between spark ignition and occurrence of the maximum pressure in said engine cylinder to predict concentration of the specific fuel, and comparing the predicted specific fuel concentration with the specific fuel concentration represented by said second sensor signal for detecting failure of said second sensor means on the basis of the difference therebetween, said eighth means replacing said specific fuel concentration represented by said second sensor signal with a given value for derivation of said second correction value.

2. A spark ignition timing control system as set forth in claim 1, wherein said eighth means compares the spark advance angle at which spark ignition is actually performed and an angle at which maximum pressure in said engine cylinder is detected for deriving an angular deviation therebetween and arithmetically derives said lag time for predicting the concentration of the selected one of fuels.

3. A spark ignition timing control system as set forth in claim 1, wherein said eighth means compares the predicted specific fuel concentration with the specific fuel concentration represented by said second sensor signal for deriving the difference, compares the derived difference with a predetermined difference criterion for detecting the derived difference greater than or equal to said difference criterion, counts-up occurrence of the derived difference greater than or equal to the difference criterion, and compares the counted value with a counter threshold to make judgement that the second sensor means is in failure when the counter value is greater than or equal to the counter threshold.

4. A spark ignition timing control system as set forth in claim 1, which further comprises ninth means for monitoring an actual air/fuel ratio of an actually combustioned air/fuel mixture, deriving a target air/fuel ratio on the basis of the specific fuel concentration represented by said second sensor signal and comparing the actual air/fuel ratio and said target air/fuel ratio to count-up occurrence of deviation between said actual air/fuel ratio and said target air/fuel ratio for making judgement that said second sensor is in failure when the counted value becomes greater than or equal to a counter criterion.

5. A spark ignition timing control system as set forth in claim 1, wherein said first sensor monitors the basic engine operating parameter including an engine revolution speed and an engine load, and said sixth means derives a first correction value component on the basis said concentration of the specific fuel and said engine revolution speed and a second correction value component on the basis of said concentration of the selected one of the fuels and said engine load.

* * * * *